US 12,179,402 B2

(12) United States Patent
Minowa et al.

(10) Patent No.: US 12,179,402 B2
(45) Date of Patent: Dec. 31, 2024

(54) PRODUCTION MANAGEMENT SYSTEM

(71) Applicant: Seiko Epson Corporation, Tokyo (JP)

(72) Inventors: Hiroki Minowa, Matsumoto (JP);
Kazuhiko Tsuchimoto, Matsumoto (JP); Takuya Higuchi, Matsumoto (JP);
Yuji Saito, Matsumoto (JP)

(73) Assignee: SEIKO EPSON CORPORATION (JP)

( * ) Notice: Subject to any disclaimer, the term of this patent is extended or adjusted under 35 U.S.C. 154(b) by 210 days.

(21) Appl. No.: 17/527,233

(22) Filed: Nov. 16, 2021

(65) Prior Publication Data

US 2022/0152901 A1    May 19, 2022

(30) Foreign Application Priority Data

Nov. 17, 2020  (JP) .................... 2020-191089

(51) Int. Cl.
*B29C 45/76*    (2006.01)
*B29C 45/42*    (2006.01)

(52) U.S. Cl.
CPC .......... *B29C 45/76* (2013.01); *B29C 45/7686* (2013.01); *B29C 45/42* (2013.01); *B29C 2945/76167* (2013.01); *B29C 2945/76913* (2013.01); *B29C 2945/76973* (2013.01); *B29C 2945/76993* (2013.01)

(58) Field of Classification Search
CPC .. B29C 2945/76973; B29C 2945/7629; B29C 2945/76317
See application file for complete search history.

(56) References Cited

U.S. PATENT DOCUMENTS

2004/0093114 A1* 5/2004 Magario ............... G05B 15/02
700/197

FOREIGN PATENT DOCUMENTS

| JP | S61-098522 A | 5/1986 |
| JP | H05-028281 A | 2/1993 |
| JP | 2005-025449 A | 1/2005 |

* cited by examiner

*Primary Examiner* — John J DeRusso
(74) *Attorney, Agent, or Firm* — Harness, Dickey & Pierce, P.L.C.

(57) ABSTRACT

A production management system includes: an injection molding unit producing a molded product; and a control device. The injection molding unit includes: an injection molding machine molding the molded product by injection molding; a determination unit determining whether a number of the molded products to be produced is equivalent to a predetermined unit of production or not; and an operation information transmitting unit transmitting operation information of the injection molding unit when it is determined that the number of the molded products to be produced is equivalent to the predetermined unit of production. The control device includes an operation information receiving unit receiving the operation information transmitted from the operation information transmitting unit.

3 Claims, 6 Drawing Sheets

PRODUCTION MANAGEMENT SYSTEM

The present application is based on, and claims priority from JP Application Serial Number 2020-191089, filed Nov. 17, 2020, the disclosure of which is hereby incorporated by reference herein in its entirety.

BACKGROUND

1. Technical Field

The present disclosure relates to a production management system.

2. Related Art

For a production management system for an injection molding unit, for example, JP-A-5-28281 discloses a technique in which an injection molding machine transmits status data and production data or the like of the injection molding machine to a management computer at a preset sampling interval. The management computer can manage the production by the injection molding machine, based on the data received from the injection molding machine.

However, in the technique of JP-A-5-28281, when the sampling interval is made longer, there is a high probability of not being able to properly grasp whether the production is proceeding as planned. Meanwhile, when the sampling interval is made shorter, the data communication volume and the processing load increase, posing a risk of affecting the operation of the injection molding machine and the management computer.

SUMMARY

According to a first aspect of the present disclosure, a production management system is provided. The production management system includes: an injection molding unit producing a molded product; and a control device. The injection molding unit includes: an injection molding machine molding the molded product by injection molding; a determination unit determining whether a number of the molded products to be produced is equivalent to a predetermined unit of production or not; and an operation information transmitting unit transmitting operation information of the injection molding unit when it is determined that the number of the molded products to be produced is equivalent to the predetermined unit of production. The control device includes an operation information receiving unit receiving the operation information transmitted from the operation information transmitting unit.

DESCRIPTION OF EXEMPLARY EMBODIMENTS

A. First Embodiment

Figure 1:
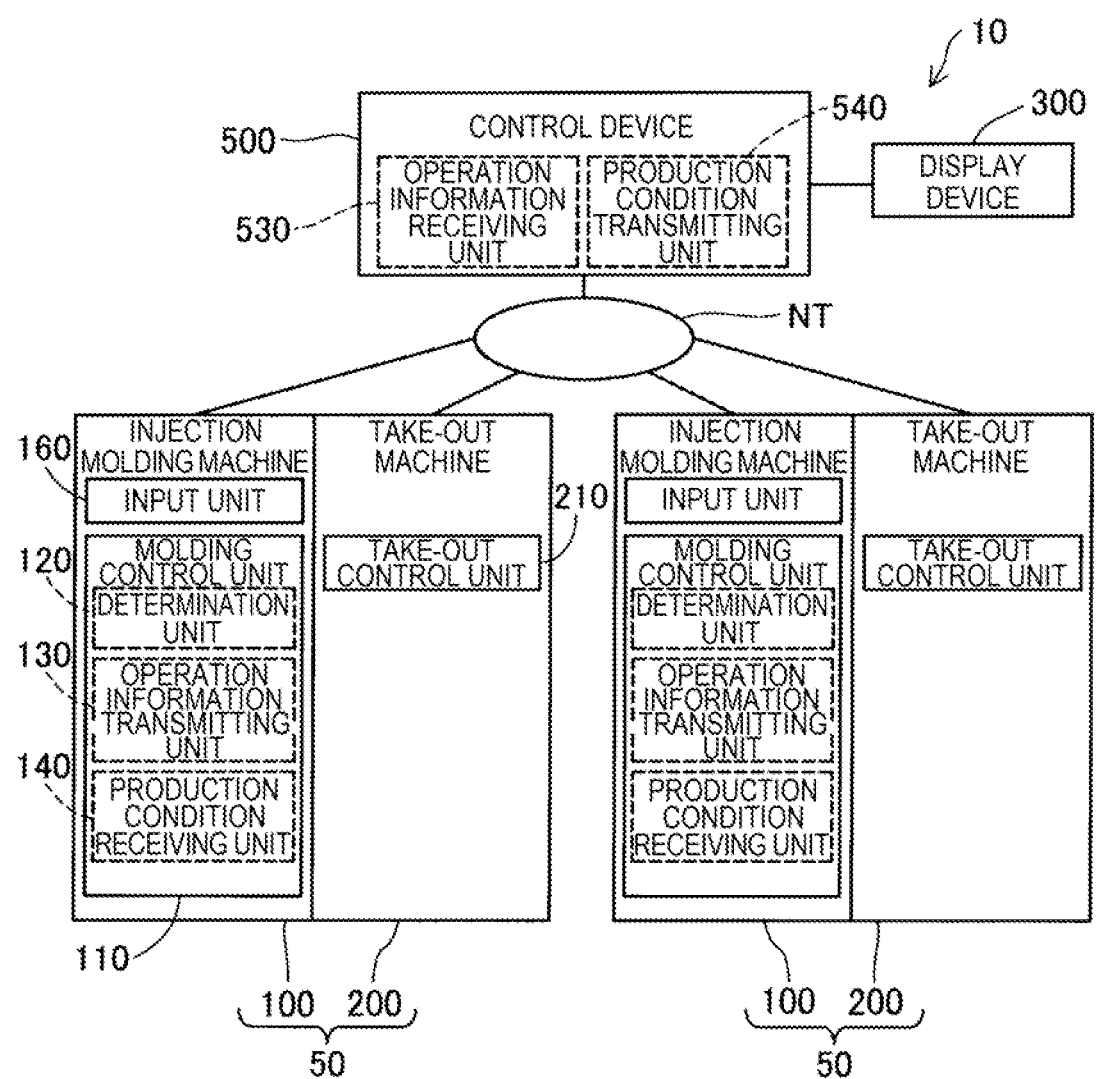
FIG. 1 is a schematic block diagram showing the configuration of a production management system according to a first embodiment.

FIG. 1 is a schematic block diagram showing the configuration of a production management system 10 according to a first embodiment. The production management system 10 has an injection molding unit 50, a control device 500, and a display device 300. The production management system 10 according to this embodiment has two injection molding units 50. In this embodiment, the two injection molding units 50 have the same configuration.

The injection molding unit 50 produces a molded product. The injection molding unit 50 in this embodiment has an injection molding machine 100 molding a molded product by injection molding, and a take-out machine 200 taking out the molded product. In this embodiment, to "produce a molded product" means to mold a molded product by the injection molding machine 100 and take out the resulting molded product by the take-out machine 200.

The injection molding machine 100 has an injection unit, a mold unit having a cavity, and a mold clamping device clamping the mold unit, each of which is not illustrated. The injection molding machine 100 in this embodiment also has a molding control unit 110 and an input unit 160. The molding control unit 110 is formed of a computer having one or a plurality of processors, a main storage device, and an input-output interface inputting and outputting a signal from and to outside. The molding control unit 110 in this embodiment achieves various functions such as a function of executing injection molding, a function as a determination unit 120, and a function of communicating with the control device 500, as described later. The molding control unit 110 may be formed of a plurality of computers.

The molding control unit 110 controls the injection unit and the mold unit of the injection molding machine 100 to execute injection molding and thus to mold a molded product. More specifically, the molding control unit 110 controls the injection unit to inject a molten material into the mold unit and controls the mold clamping device to clamp the mold unit, thus molding a molded product having a shape corresponding to the shape of the cavity. In this embodiment, the number of cavities in the mold unit is one. That is, in this injection molding, one molded product is molded by one shot. In another embodiment, the number of cavities in the mold unit may be not one but may be two or more.

The molding control unit 110 in this embodiment produces a molded product according to a production condition. The production condition in this embodiment is prepared in advance corresponding to each specification of a molded product and includes a molding program for executing injection molding and a planned number of products, that is, the number of molded products to be produced. In this embodiment, a reference unit of production, described later, is decided based on the production condition. Specifically, the production condition in this embodiment includes the reference unit of production in addition to the molding program and the planned number of products, described above. In this embodiment, the correspondence between the specification of the molded product and the production condition is recorded in a database. The database is stored in a storage device provided in the control device 500.

The molding control unit 110 executes injection molding according to the molding program. The molding program is a program for the injection molding machine 100 to perform injection molding by one shot, and designates the timing of changing a control value for the injection unit and the mold clamping device or the like, and the magnitude or the like of the control value. The molding control unit 110 executes the molding program and performs injection molding the number of times corresponding to the planned number of products included in the production condition, thus molding the planned number of molded products.

The determination unit 120 executes determination processing of determining whether the number of molded products to be produced is equivalent to a reference unit of production or not. The reference unit of production refers to a predetermined unit of production used for the determination processing. The unit of production refers to a unit of production management in the production management system 10. In this embodiment, shot, box, lot, and job are used as units of production. One job is a unit of production formed of a plurality of lots. One lot is a unit of production formed of a plurality of boxes. One box is a unit formed of a plurality of shots. One shot is a unit representing one shot in the injection molding by the injection molding machine 100. Therefore, the unit of production becomes larger in the order of shot, box, lot, and job. When the number of cavities in the mold unit is one as in this embodiment, one shot corresponds to one molded product.

The molding control unit 110 in this embodiment is configured to be able to communicate data with the control device 500. The molding control unit 110 functions as an operation information transmitting unit 130 and a production condition receiving unit 140. The operation information transmitting unit 130 transmits operation information of the injection molding unit 50 to an operation information receiving unit 530 provided in the control device 500, described later. The production condition receiving unit 140 receives a production condition transmitted from a production condition transmitting unit 540 provided in the control device 500, described later.

The input unit 160 is formed of an input device, for example, a keyboard, a microphone or the like that accepts an input of information from a user. The input unit 160 may be an input unit that also functions as a display unit, such as a liquid crystal panel accepting a touch input.

The take-out machine 200 in this embodiment is formed of a take-out control unit 210, and a take-out robot and a cutter, each of which is not illustrated. The take-out robot is a robot taking out a molded product from the mold unit of the injection molding machine 100. The cutter is a device cutting a sprue and a runner molded together with the molded product in the mold unit and thus eliminating the sprue and the runner from the molded product. The take-out robot in this embodiment uses an end effector attached at the distal end of an arm of the take-out robot and thus directly grips and takes out the molded product released from the mold unit by an ejector pin of the injection molding machine 100. Subsequently, the cutter eliminates a sprue and a runner from the molded product. In another embodiment, the take-out robot may be, for example, a robot sucking and gripping the molded product, or the like. The take-out machine 200 may not have the cutter.

The take-out control unit 210 is formed of a computer or the like, similarly to the molding control unit 110. The take-out control unit 210 in this embodiment controls the operation of the take-out robot and the cutter and thus achieves various functions such as a function of performing take-out processing and a function of communicating with the control device 500.

The control device 500 is formed of a computer having one or a plurality of processors, a main storage device, and an input-output interface inputting and outputting a signal from and to outside. The control device 500 may be formed of a plurality of computers. The control device 500 in this embodiment achieves various functions such as a function of communicating with the molding control unit 110 and the take-out control unit 210 and a function of causing the display device 300 to display information. The control device 500 functions as the operation information receiving unit 530 and the production condition transmitting unit 540. The operation information receiving unit 530 receives data of operation information or the like transmitted from the operation information transmitting unit 130. The production condition transmitting unit 540 transmits a production condition to the production condition receiving unit 140.

The control device 500 is configured to be able to communicate with the injection molding unit 50. In this embodiment, as shown in FIG. 1, the control device 500, the molding control unit 110, and the take-out control unit 210 are configured to be able to communicate with each other via a network NT. The network NT may be, for example, a LAN, a WAN, or the internet. The control device 500 and the injection molding unit 50 may be coupled to be able to communicate with each other via a separate communication line instead of the network. Similarly, the injection molding units 50 may be coupled to be able to communicate with each other via a separate communication line instead of the network.

The display device 300 is formed of a liquid crystal display or the like electrically coupled to the control device 500. The control device 500 causes the display device 300 to display, for example, information about the production management for the injection molding unit 50. The display device 300 may also function as an input device, for example, like a liquid crystal panel accepting a touch input.

Figure 2:
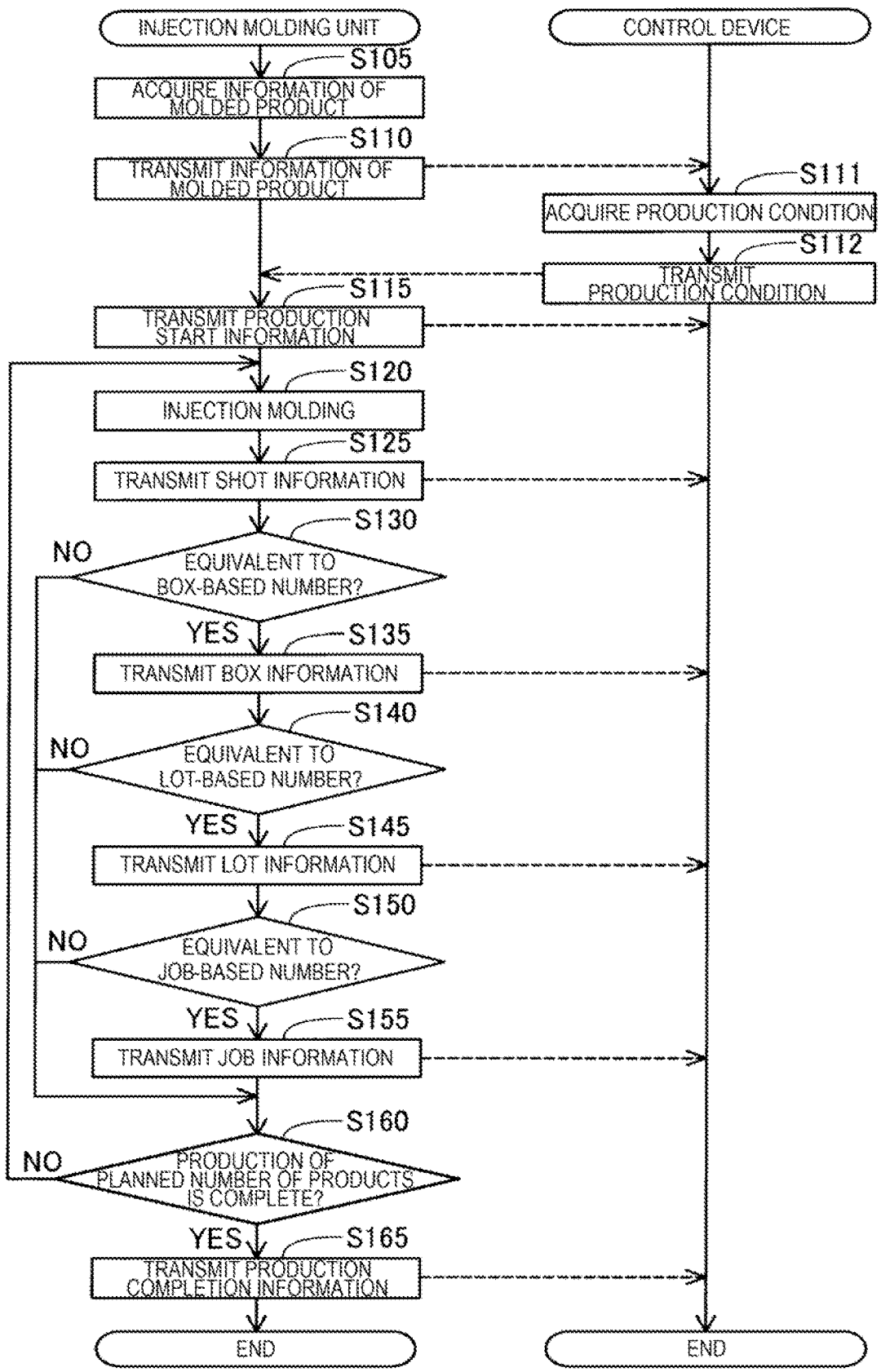
FIG. 2 is a process chart showing molded product production processing in the first embodiment.

FIG. 2 is a process chart showing molded product production processing in this embodiment. The molded product production processing is the processing executed to produce a molded product in the production management system 10. FIG. 2 shows both the processing executed by the molding control unit 110 provided in the injection molding machine 100 of the injection molding unit 50 and the processing executed by the control device 500, in the molded product production processing.

In step S105, the molding control unit 110 acquires information for specifying the specification of a molded product to be molded. Specifically, the molding control unit 110 acquires type information of the molded product to be molded, material information and metal mold information for molding the molded product, and the like. For example, when the specification of the molded product can be categorized by job number, the molding control unit 110 may acquire the job number as the information for specifying the specification of the molded product. These pieces of information of the molded product are inputted, for example, by the user via the input unit 160. In step S110, the molding control unit 110 transmits the information of the molded product acquired in step S105 to the control device 500. The control device 500 receives the information of the molded product transmitted from the molding control unit 110.

In step S111, the control device 500 acquires a production condition, based on the information of the molded product transmitted from the molding control unit 110. In this embodiment, the control device 500 in step S111 reads the production condition for producing the molded product of the corresponding specification, from the storage device of the control device 500, based on the information of the molded product transmitted thereto.

In step S112, the control device 500 transmits the production condition acquired in step S111 to the molding control unit 110. The molding control unit 110 receives the production condition transmitted from the control device 500.

As described above, the production condition in this embodiment includes the reference unit of production and the planned number of products. The reference unit of production in this embodiment is one job, one lot, and one box. In this embodiment, one job is formed of 10 lots. One lot is formed of 10 boxes. One box is formed of 10 shots. That is, molding molded products corresponding to one job can be paraphrased as molding molded products corresponding to 10 lots forming the job, molding molded products corresponding to 100 boxes forming the job, and molding molded products corresponding to 1000 shots forming the job. For example, starting the production for the first shot of a job means starting the production for the job, starting the production for the first lot included in the job, and starting the production for the first box included in the lot. The planned number of products in this embodiment is 10000 shots. That is, the planned number of products in this embodiment is equivalent to the production for 10 jobs. The planned number of products may be expressed, for example, by another unit of production than shot and may be expressed, for example, by the number of jobs.

In step S115, the molding control unit 110 executes production start information transmission processing. The production start information transmission processing is processing in which the operation information transmitting unit 130 transmits production start information, which is information about the start of the production of the molded product. In step S115, the molding control unit 110 transmits information representing that the production of molded products of a job number 1 is started, information representing that the production of molded products of a lot number 1 is started, information representing that the production for a box number 1 is started, and information representing that the production for a shot number 1 is started, as the production start information, to the control device 500. The control device 500 receives the production start information transmitted from the molding control unit 110.

In step S120, the molding control unit 110 controls the injection unit and the mold clamping device of the injection molding machine 100 according to the molding program included in the production condition and thus performs injection molding. Thus, the material is injected into the mold unit of the injection molding machine 100 and the molded product is molded in the mold unit. The molded product molded in step S120 is taken out by the take-out machine 200. As the injection molding and the take-out of the molded product are thus performed, the molded product is produced.

In steps S125 to S155, the molding control unit 110 executes operation information transmission processing. The operation information transmission processing is processing in which the operation information transmitting unit 130 transmits operation information, which is information about the operation of the injection molding unit. First, in step S125, the molding control unit 110 functioning as the operation information transmitting unit 130 transmits shot information, which is information about the production of the molded product corresponding to one shot, as the operation information, to the operation information receiving unit 530. Specifically, the molding control unit 110 in step S125 transmits the shot number corresponding to the injection molding executed in step S120 and information representing that the production for the shot number is complete, as the shot information, to the control device 500 functioning as the operation information receiving unit 530. The control device 500 receives the shot information transmitted from the molding control unit 110.

Next, in steps S130 to S155, the molding control unit 110 functioning as the operation information transmitting unit 130 transmits the operation information to the control device 500 functioning as the operation information receiving unit 530, when it is determined by the determination processing that the number of molded products to be produced is equivalent to the reference unit of production.

In step S130, the molding control unit 110 functioning as the determination unit 120 determines whether the number of molded products to be produced as of the time of executing step S130 is equivalent to a box-based number or not. In this embodiment, the molding control unit 110 in step S130 determines that the number of molded products to be produced is equivalent to a box-based number, when the total number of shots for the molded product as of the time of executing step S130 is a multiple of 10.

In another embodiment, the determination unit 120 in step S130 may determine that the number of molded products to be produced is equivalent to a box-based number, for example, when the number of shots for the molded product corresponding to the box number as of the time of executing step S130 is equal to 10. For example, when the total number of shots for the molded product as of the time of executing step S130 is 20, the box number is 2 and the number of shots corresponding to the box number 2 is 10. Therefore, in this case, the determination unit 120 in step S130 determines that the number of molded products to be produced is equivalent to a box-based number.

When it is determined in step S130 that the number of molded products to be produced is equivalent to a box-based number, the molding control unit 110 functioning as the operation information transmitting unit 130 in step S135 transmits box information, which is information about the production of molded products corresponding to one box, as the operation information, to the control device 500 functioning as the operation information receiving unit 530. Specifically, the molding control unit 110 in step S135 transmits the box number of the box for which the production is complete and information representing that the production of molded products corresponding to the box is complete, as the box information, to the control device 500. The control device 500 receives the box information transmitted from the molding control unit 110.

Next, in step S140, the molding control unit 110 determines whether the number of molded products to be produced as of the time of executing step S140 is equivalent to a lot-based number or not. In this embodiment, the molding control unit 110 in step S140 determines that the number of molded products to be produced is equivalent to a lot-based number, when the total number of shots for the molded product as of the time of executing step S140 is a multiple of 100. In another embodiment, the determination unit 120 in step S140 may determine that the number of molded products to be produced is equivalent to a lot-based number, for example, when the number of shots for the molded product corresponding to the lot number as of the time of executing step S140 is equal to 100.

When it is determined in step S140 that the number of molded products to be produced is equivalent to a lot-based number, the molding control unit 110 in step S145 transmits lot information, which is information about the production of molded products corresponding to one lot, as the operation information, to the control device 500. Specifically, the molding control unit 110 in step S145 transmits the lot number of the lot for which the production is complete and information representing that the production of molded products corresponding to the lot is complete, to the control device 500. The control device 500 receives the lot information transmitted from the molding control unit 110.

Next, in step S150, the molding control unit 110 determines whether the number of molded products to be produced as of the time of executing step S150 is equivalent to a job-based number or not. In this embodiment, the molding control unit 110 in step S150 determines that the number of molded products to be produced is equivalent to a job-based number, when the total number of shots for the molded product as of the time of executing step S150 is a multiple of 1000. In another embodiment, the determination unit 120 in step S150 may determine that the number of molded products to be produced is equivalent to a job-based number, for example, when the number of shots for the molded product corresponding to the job number as of the time of executing step S150 is equal to 1000.

When it is determined in step S150 that the number of molded products to be produced is equivalent to a job-based number, the molding control unit 110 in step S155 transmits job information, which is information about the production of molded products corresponding to one job, as the operation information, to the control device 500. Specifically, the molding control unit 110 in step S155 transmits the job number of the job for which the production is complete and information representing that the production of molded products corresponding to the job is complete, to the control device 500. The control device 500 receives the job information transmitted from the molding control unit 110.

In step S160, the molding control unit 110 determines whether the production of the planned number of molded products is complete or not. When it is determined that the production of the planned number of molded products is not complete, the molding control unit 110 returns the processing to step S120 and produces the next molded product.

Figure 3:
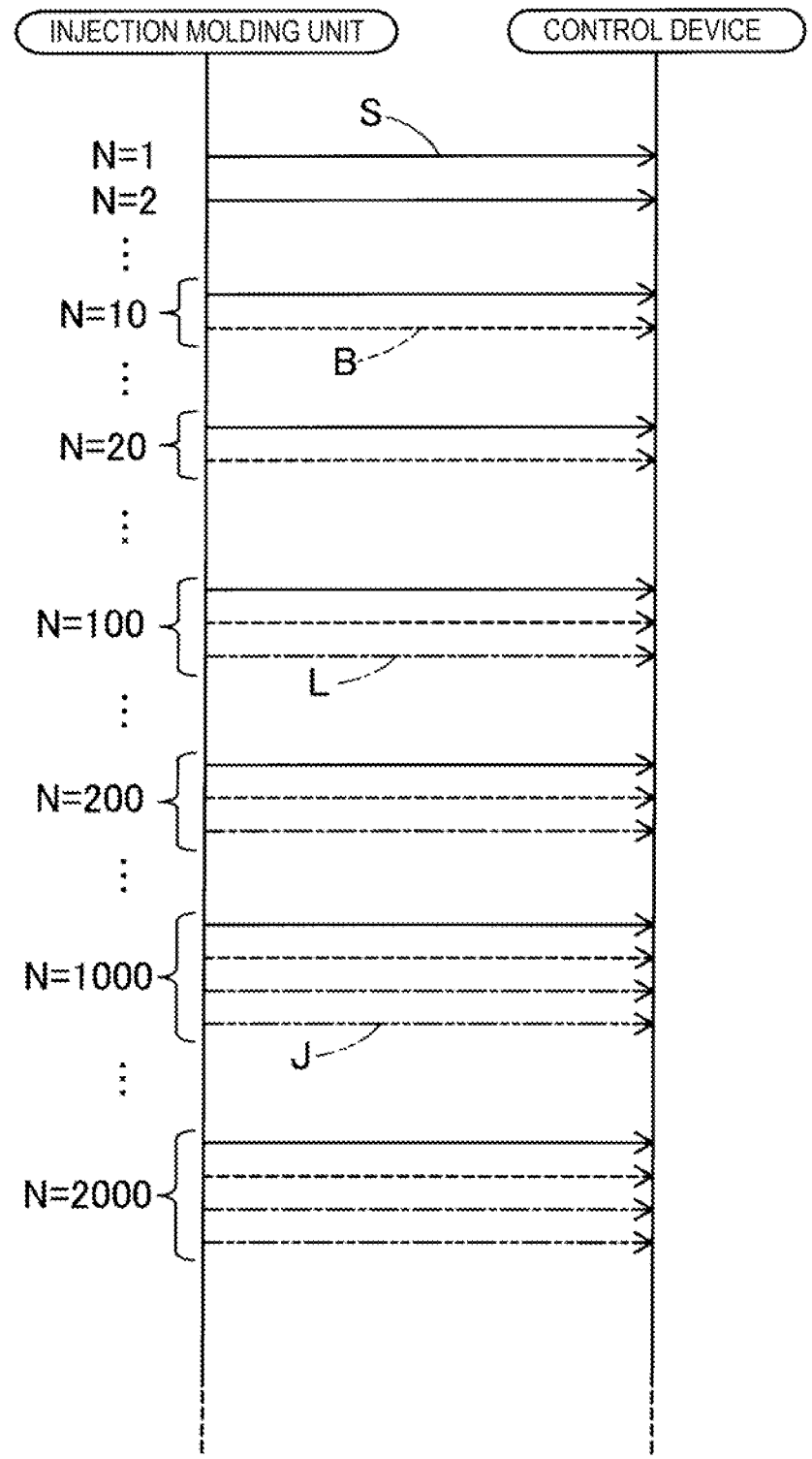
FIG. 3 explains operation information transmission processing in the first embodiment.

FIG. 3 explains the operation information transmission processing in this embodiment. FIG. 3 shows the correspondence between a total number of shots N in the molded product production processing and the operation information transmitted from the molding control unit 110 to the control device 500 in steps S125 to S155 shown in FIG. 2. For example, when the total number of shots N is one or two, the molding control unit 110 transmits only shot information S in the operation information transmission processing. When the total number of shots N is a multiple of 10, the molding control unit 110 transmits shot information S and box information B. When the total number of shots N is a multiple of 100, the molding control unit 110 transmits shot information S, box information B, and lot information L. When the total number of shots N is a multiple of 1000, the molding control unit 110 transmits shot information S, box information B, lot information L, and job information J. Thus, every time the production corresponding to the reference unit of production is completed by the injection molding unit 50, the operation information is transmitted to the control device 500.

When it is determined in step S160 that the production of the planned number of molded products is complete, the molding control unit 110 in step S165 executes production completion information transmission processing. The production completion information transmission processing is processing in which the molding control unit 110 functioning as the operation information transmitting unit 130 transmits production completion information, which is information about the completion of the production of the molded product. In this embodiment, the molding control unit 110 transmits information representing that the production of the molded products corresponding to all the shots, all the boxes, all the lots, and all the jobs is complete, as the production completion information, to the control device 500. Subsequently, the molding control unit 110 ends the molded product production processing in the molding control unit 110. The control device 500 receives the production completion information transmitted from the molding control unit 110 and subsequently ends the molded product production processing in the control device 500.

In the molded product production processing, the control device 500 may cause the display device 300 to display, for example, the operation information received from the molding control unit 110, a target number of products to be produced, a target production time, a difference between the target number of products to be produced and the target production time on one hand and the current number of products produced and the current production time on the other hand, and a graph or the like showing the status of production prepared by analyzing the operation information. For example, the user can recognize the information displayed on the display device 300, grasp a delay or the like in the actual production in relation to a production plan for achieving a predetermined target number of products to be produced, and change the production plan or the like in order to achieve the target number of products to be produced.

In the production management system 10 according to this embodiment as described above, the determination unit 120 of the injection molding unit 50 determines whether the number of molded products to be produced is equivalent to the reference unit of production or not. When it is determined that the number of molded products to be produced is equivalent to the reference unit of production, the operation information transmitting unit 130 transmits the operation information of the injection molding unit 50 to the control device 500. Thus, the operation information receiving unit 530 of the control device 500 can receive the operation information of the injection molding unit 50 at the timing when the molded products of which the production number equivalent to the predetermined unit of production are produced. Therefore, whether the production is proceeding as planned or not can be properly grasped and an increase in the data communication volume and the processing load can be restrained.

In this embodiment, the injection molding unit 50 has the take-out machine 200. Therefore, even when the injection molding unit 50 is configured to produce the molded product by causing the injection molding machine 100 to mold the molded product and causing the take-out machine 200 to take out the molded product, whether the production is proceeding as planned or not can be properly grasped and an increase in the data communication volume and the processing load can be restrained.

In this embodiment, the reference unit of production is decided, based on the production condition. Therefore, the injection molding unit 50 can produce the molded product according to the production condition and can perform the determination by the determination unit 120 using the reference unit of production decided based on the production condition, without separately acquiring the reference unit of production. Thus, with simpler control, whether the production is proceeding as planned or not can be properly grasped and an increase in the data communication volume and the processing load can be restrained.

In this embodiment, the production condition transmitting unit 540 of the control device 500 transmits the production condition to the production condition receiving unit 140 of the injection molding unit 50 before the production of the molded product. Thus, the injection molding unit 50 can produce the molded product according to the production condition transmitted from the control device 500 and can perform the determination using the reference unit of production decided based on the production condition.

In another embodiment, the production condition may not include the reference unit of production. In this case, the reference unit of production may be decided, for example, based on the planned number of products included in the production condition. More specifically, for example, the number of molded products and the reference unit of production may be recorded in association with each other in the storage device of the molding control unit 110, and in steps S130 to S155, the molding control unit 110 may read the reference unit of production associated with the number of molded products corresponding to the planned number of products included in the production condition transmitted from the control device 500, from the storage device of the molding control unit 110, and use the reference unit of production for the determination. The molding control unit 110 may also multiply the planned number of products included in the production condition transmitted from the control device 500, for example, by a predetermined coefficient, and thus decide the reference unit of production. Preferably, the coefficient is decided, for example, as a value suitable for production management and quality management. Also, the production condition may include the specification of the molded product to be produced, and the reference unit of production may be decided, based on the specification of the molded product included in the production condition.

The production condition may not include the molding program. In this case, for example, the molding control unit 110 may receive the molding program separately from the production condition, from the control device 500. Also, the molding program may be recorded, for example, in the storage device of the molding control unit 110. In this case, the molding control unit 110 may produce the molded product according to the production condition transmitted from the control device 500 and not including the molding program, and the molding program read from the storage device of the molding control unit 110.

In the first embodiment, the control device 500 in step S111 acquires the production condition, based on the information of the molded product transmitted from the molding control unit 110, and in step S112 transmits the acquired production condition to the molding control unit 110. Meanwhile, the control device 500 may transmit the production condition to the molding control unit 110, for example, according to the production target and the production plan, and thus cause the molding control unit 110 to produce the molded product. Particularly in the production management system 10 having a plurality of injection molding units 50 as in this embodiment, when the production condition is transmitted from the control device 500 to the injection molding units 50 according to the production target and the production plan, each injection molding unit 50 can produce the molded product efficiently and whether or not the production is proceeding as planned as a whole in the production management system 10 can be properly grasped.

B. Second Embodiment

Figure 4:
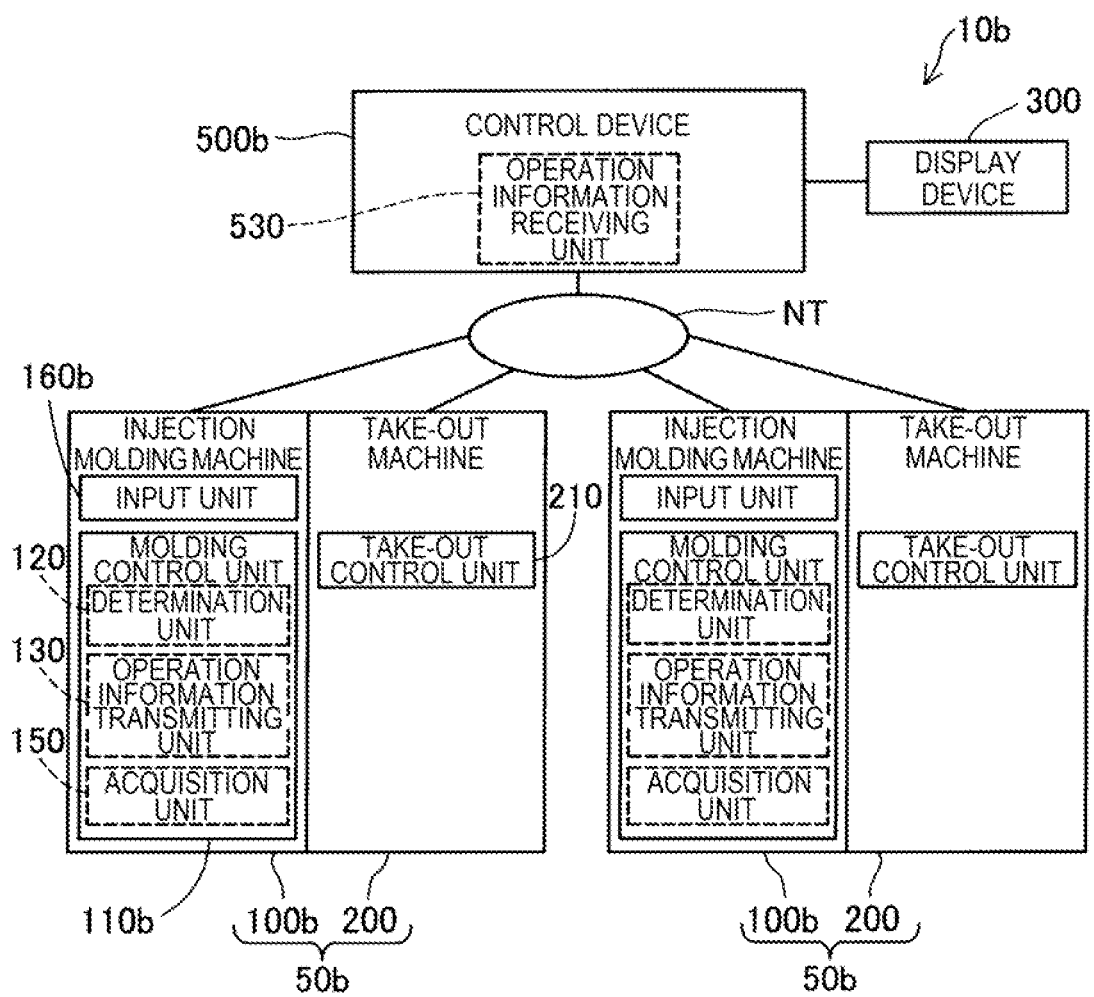
FIG. 4 is a schematic block diagram showing the configuration of a production management system according to a second embodiment.

FIG. 4 is a schematic block diagram showing the configuration of a production management system 10b according to a second embodiment. In this embodiment, an injection molding unit 50b has an acquisition unit 150, unlike in the first embodiment. The unit of production used for the determination processing is not decided by the production condition but is acquired by the acquisition unit 150 separately from the production condition. Of the configurations in the production management system 10b according to this embodiment, configurations that are not particularly described are similar to those in the first embodiment.

An injection molding machine 100b of the injection molding unit 50b in this embodiment has the above acquisition unit 150. Specifically, in this embodiment, a molding control unit 110b functions as the acquisition unit 150. The acquisition unit 150 acquires the reference unit of production. The acquisition unit 150 in this embodiment acquires the reference unit of production inputted via an input unit 160b. The input unit 160b in this embodiment accepts an input of the reference unit of production.

The injection molding unit 50b in this embodiment does not have the production condition receiving unit 140, unlike in the first embodiment. A control device 500b does not have the production condition transmitting unit 540, unlike in the first embodiment.

The molding control unit 110b produces the molded product according to the production condition, as in the first embodiment. The production condition in this embodiment includes the molding program and the planned number of products, as in the first embodiment. Meanwhile, in this embodiment, the production condition does not include the reference unit of production. As described above, the reference unit of production is not decided by the production condition.

Figure 5:
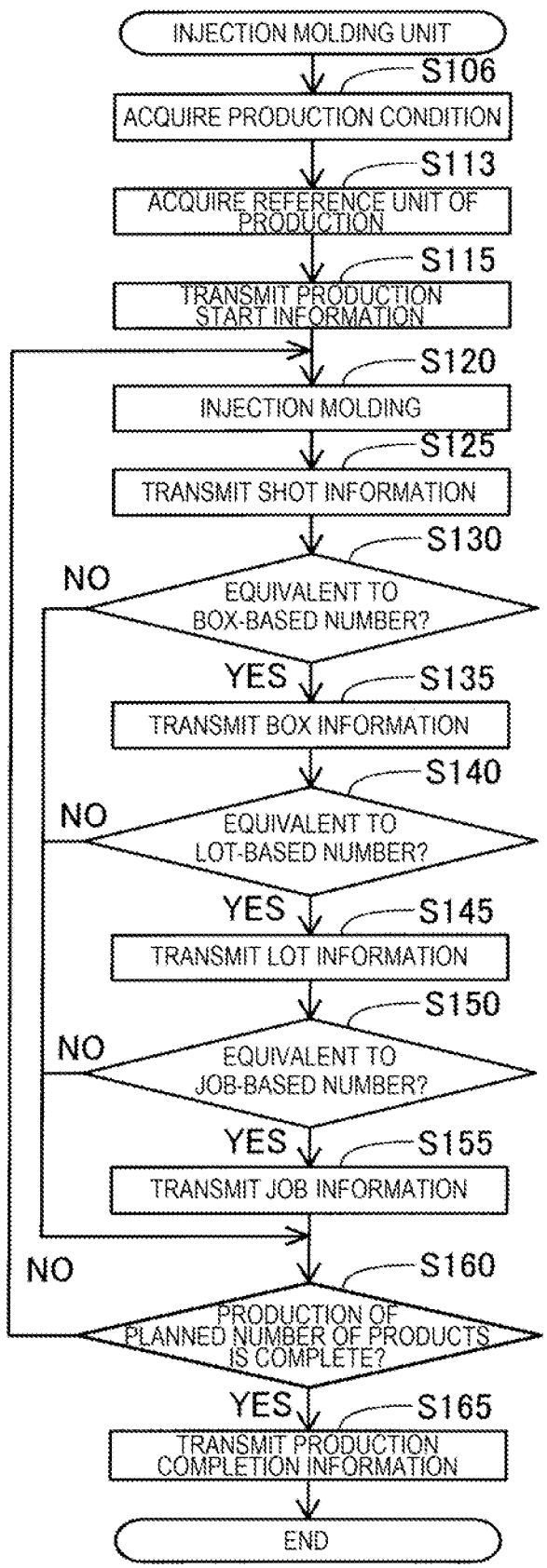
FIG. 5 is a process chart showing molded product production processing in the second embodiment.

FIG. 5 is a process chart showing molded product production processing in the second embodiment. FIG. 5 shows the processing executed by the molding control unit 110b in the molded product production processing. Of the steps shown in FIG. 5, steps similar to steps in FIG. 2 are denoted by the same reference signs as the steps in FIG. 2.

In step S106, the molding control unit 110b functioning as the acquisition unit 150 acquires the production condition of the molded product. In this embodiment, the molding control unit 110b acquires the production condition in step S106. In step S106, the molding control unit 110b acquires, for example, the planned number of products inputted by the user via the input unit 160b. Also, in step S106, the molding control unit 110b acquires, for example, the molding program recorded in advance in the storage device provided in the molding control unit 110b. Thus, the data communication volume and the processing load on the control device 500b can be reduced further, compared with when the molding control unit 110b acquires the planned number of products and the molding program from the control device 500b.

In step S113, the molding control unit 110b functioning as the acquisition unit 150 acquires the reference unit of production. The acquisition unit 150 in this embodiment acquires the reference unit of production inputted via the input unit 160b, as described above. For example, when the injection molding unit 50*b* has a display unit, the molding control unit 110*b* in step S113 may display a dialog or the like prompting the user to input the reference unit of production, on the display unit.

In the above-described production management system 10*b* according to the second embodiment, whether the production is proceeding as planned or not can be properly grasped and an increase in the data communication volume and the processing load can be restrained. Particularly in this embodiment, the acquisition unit 150 of the injection molding unit 50*b* acquires the reference unit of production. Therefore, in the injection molding unit 50*b*, the determination unit 120 can perform the determination processing, using the reference unit of production acquired by the acquisition unit 150.

In this embodiment, the acquisition unit 150 acquires the reference unit of production inputted via the input unit 160*b* of the injection molding unit 50*b*. Thus, the injection molding unit 50*b* can acquire the reference unit of production without having communication or the like with the control device 500*b*. Therefore, the data communication volume and the processing load on the control device 500*b* can be reduced further.

In another embodiment, the acquisition unit 150 may acquire the reference unit of production from the control device 500*b*. In this case, the acquisition unit 150 can acquire the reference unit of production from the control device 500*b*, for example, by communicating with the control device 500*b*. In the injection molding unit 50*b* having such a configuration, the determination unit 120 can perform the determination, using the reference unit of production acquired from the control device 500*b*. Also, the reference unit of production can be acquired, for example, even when the input unit 160*b* is not provided in the injection molding unit 50*b*. Therefore, the injection molding unit 50*b* can be miniaturized. Moreover, when the production management system 10*b* has a plurality of injection molding units 50*b* as in this embodiment, the acquisition unit 150 of each injection molding unit 50*b* acquires the reference unit of production from the control device 500*b*. Thus, the reference unit of production need not be directly inputted or the like to each injection molding unit 50*b*. Therefore, the molded product can be produced more efficiently and whether the production is proceeding as planned or not can be properly grasped.

C. Third Embodiment

Figure 6:
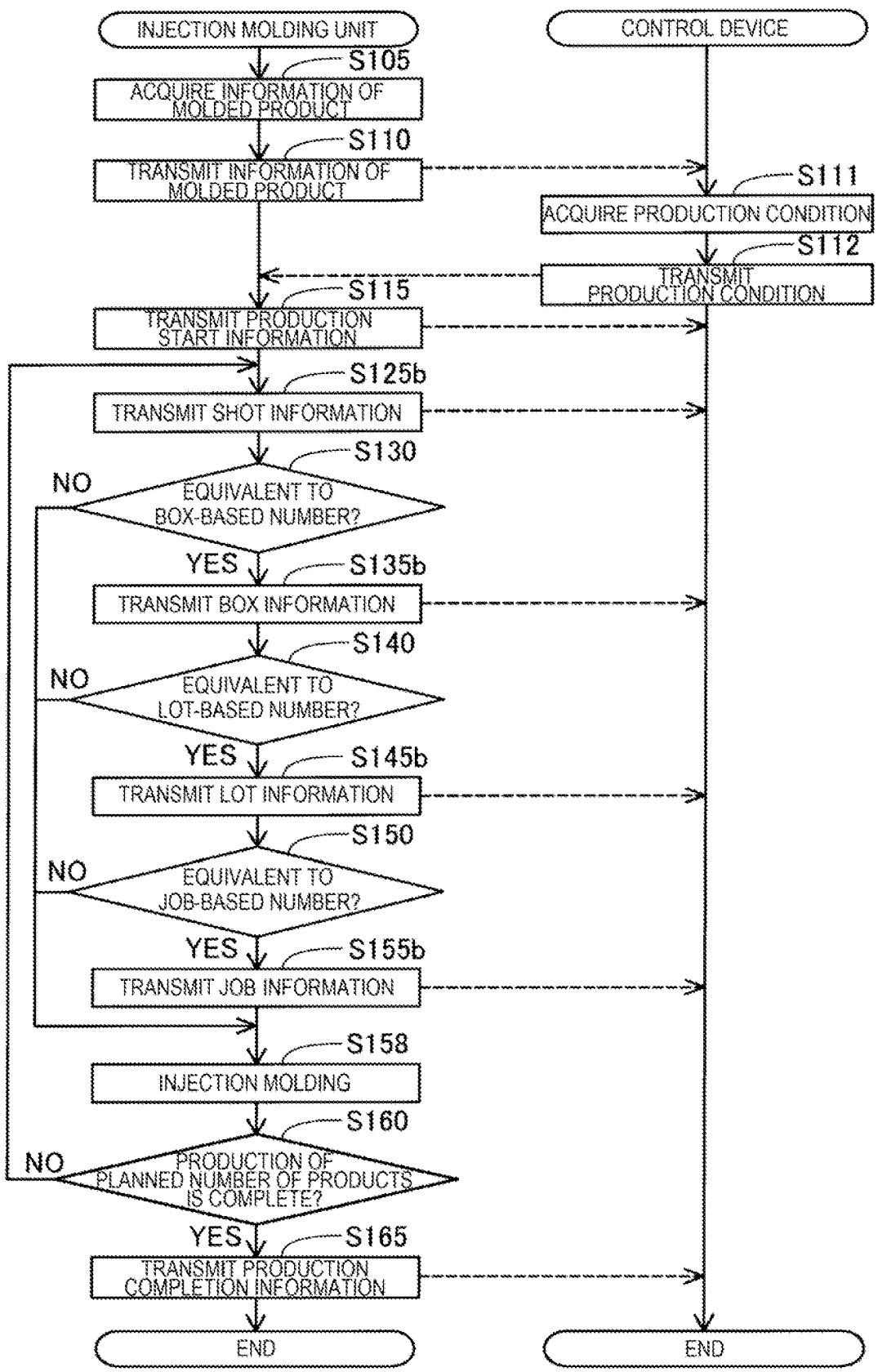
FIG. 6 is a process chart showing molded product production processing in a third embodiment.

FIG. 6 is a process chart showing molded product production processing in a third embodiment. FIG. 6 shows both the processing executed by the molding control unit 110 provided in the injection molding machine 100 of the injection molding unit 50 and the processing executed by the control device 500, in the molded product production processing, as in FIG. 2. Of the steps shown in FIG. 6, steps similar to steps in FIG. 2 are denoted by the same reference signs as the steps in FIG. 2. Of the configurations in the production management system 10 according to this embodiment, configurations that are not particularly described are similar to those in the first embodiment.

In this embodiment, unlike in the first embodiment, the molding control unit 110 functioning as the operation information transmitting unit 130 transmits information representing that the production for a unit of production equivalent to the next reference unit of production is to start, to the control device 500 functioning as the operation information receiving unit 530, before starting the production for a unit of production equivalent to the reference unit of production.

As shown in FIG. 6, after step S115, unlike in the first embodiment, the molding control unit 110 transmits shot information as the operation information in step S125*b* instead of performing injection molding. Specifically, in step S125*b*, the molding control unit 110 transmits a next shot number, which is the shot number as of the time of starting step S125*b* plus 1, and information representing that the production for the next shot number is to start, as the shot information, to the control device 500. For example, in step S125*b*, when the shot number as of the time of executing step S125*b* is 10, the molding control unit 110 transmits a shot number 11 and information representing that the production for the shot number 11 is to start, to the control device 500. The operation information receiving unit 530 receives the shot information transmitted from the operation information transmitting unit 130.

Step S130 in FIG. 6 is similar to step S130 in FIG. 2. For example, when the total number of shots as of the time of executing step S130 is 10, the total number of shots is a multiple of 10 and therefore the molding control unit 110 determines that the number of molded products to be produced is equivalent to a box-based number.

When it is determined in step S130 that the number of molded products to be produced is equivalent to a box-based number, the molding control unit 110 in step S135*b* transmits a next box number, which is the box number as of the time of starting step S135*b* plus 1, and information representing that the production for the next box number is to start, as box information, that is, as the operation information, to the control device 500. For example, when the box number as of the time of executing step S125*b* is 1 in the above step S125*b*, the molding control unit 110 transmits a box number 2 and information representing that the production for the box number 2 is to start, to the control device 500.

In step S145*b*, as in step S135*b*, the molding control unit 110 transmits a next lot number, which is the lot number as of the time of starting step S145*b* plus 1, and information representing that the production for the next lot number is to start, as lot information, that is, as the operation information, to the control device 500. In step S155*b*, the molding control unit 110 transmits a next job number, which is the job number as of the time of starting step S155*b* plus 1, and information representing that the production for the next job number is to start, as job information, that is, as the operation information, to the control device 500.

In step S158, the molding control unit 110 performs injection molding as in step S120 in FIG. 2. For example, when the injection molded executed in step S158 corresponds to a shot number 11, information representing that the production for the shot number 11 is to start is transmitted to the control device 500 in step S125*b* executed before step S158, and information representing that the production for the box number 2 is to start is transmitted to the control device 500 in step S135*b* executed before step S158.

In the above-described production management system 10 according to the third embodiment, whether the production is proceeding as planned or not can be properly grasped and an increase in the data communication volume and the processing load can be restrained. In another embodiment, the operation information transmitting unit 130 may transmit the operation information to the operation information receiving unit 530 both at a timing before the production for a unit of production equivalent to the reference unit of production starts and at a timing after the production for the unit of production equivalent to the reference unit of production is completed. In this case, whether the production is proceeding as planned or not can be grasped more properly.

D. Other Embodiments (D-1) In the foregoing embodiments, the determination unit 120 and the operation information transmitting unit 130 are provided in the injection molding machine 100 of the injection molding unit 50. However, the determination unit 120 and the operation information transmitting unit 130 may be provided in the take-out machine 200 of the injection molding unit 50. In this case, the take-out control unit 210 of the take-out machine 200 may function as the determination unit 120 and the operation information transmitting unit 130. When the injection molding unit 50 has, for example, a control device or the like controlling one or both of the injection molding machine 100 and the take-out machine 200, the determination unit 120 and the operation information transmitting unit 130 may be provided in the control device or the like.

(D-2) In the foregoing embodiments, the injection molding unit 50 has the take-out machine 200. However, the injection molding unit 50 may not have the take-out machine 200. In this case, the "production of the molded product" may refer to only molding the molded product by the injection molding machine 100.

(D-3) In the foregoing embodiment, the injection molding machine 100 of the injection molding unit 50 has the acquisition unit 150. However, the take-out machine 200 of the injection molding unit 50 may have the acquisition unit 150. When the injection molding unit 50 has, for example, a control device or the like controlling one or both of the injection molding machine 100 and the take-out machine 200, the control device or the like may have the acquisition unit 150.

(D-4) In the foregoing embodiments, the injection molding machine 100 of the injection molding unit 50 has the input unit 160. However, the injection molding machine 100 may not have the input unit 160. For example, the take-out machine 200 may have the input unit 160. When the injection molding unit 50 has, for example, a control device or the like controlling one or both of the injection molding machine 100 and the take-out machine 200, the control device or the like may have the input unit 160. Also, the injection molding unit 50 may not have the input unit 160.

(D-5) In the foregoing embodiments, the molding control unit 110 executes the production start information transmission processing and the production completion information transmission processing, in the molded product production processing. However, the molding control unit 110 may execute only one or neither of the production start information transmission processing nor the production completion information transmission processing, in the molded product production processing.

(D-6) In the foregoing embodiments, the units of product are shot, box, lot, and job. However, the units of production may be not shot, box, lot, or job. The name of each unit of production and the correspondence between the numbers of products for the respective units of production may be arbitrary. In this case, preferably, each unit of production is defined as a unit suitable for production management and quality management.

(D-7) In the foregoing embodiments, the operation information transmitting unit 130 transmits the operation information for every shot. However, the operation information transmitting unit 130 may not transmit the operation information for every shot. For example, when the reference unit of production is box, lot, or job, as in the foregoing embodiments, the operation information transmitting unit 130 may transmit box information, lot information, or job information, when it is determined in the determination processing that the number of molded products to be produced is equivalent to a box-based number, a lot-based number, or a job-based number. In this case, an increase in the data communication volume and the processing load can be restrained further.

(D-8) In the foregoing embodiments, the operation information transmitting unit 130 transmits the number of the unit of production for which the production is complete or started, and information representing that the production of the molded product corresponding to the unit of production is complete or started, as the operation information. However, the operation information transmitting unit 130 may transmit, for example, only the number of the unit of production for which the production is complete or started, as the operation information, and the control device 500 may acknowledge that the production for the unit of production is complete or started, on receiving the number of the unit of production transmitted from the operation information transmitting unit 130. Also, the operation information transmitting unit 130 may transmit the information representing that the production for the reference unit of production is complete or started, as the operation information, without transmitting the number of the unit of production, and the control device 500 may count the number of times the information transmitted from the operation information transmitting unit 130 is received, and thus may calculate the number of the unit of production for which the production is complete or started. The operation information transmitting unit 130 may also transmit information about the stop and restart of the injection molding unit 50 and whether the maintenance of the injection molding unit 50 is performed or not, various data such as the temperature and pressure in the injection unit and the mold unit of the injection molding machine 100 acquired by a sensor or the like, not illustrated, vibration data at the time of take-out by the take-out machine 200, and the like, along with the operation information.

(D-9) In the foregoing embodiments, the production management system 10 has two injection molding units 50. However, the production management system 10 may have only one injection molding unit 50 or may have three or more injection molding units 50.

E. Other Aspects

The present disclosure is not limited to the foregoing embodiments and can be implemented according to various aspects without departing from the spirit and scope of the present disclosure. For example, the present disclosure can be implemented according to the aspects described below. A technical feature in the embodiments corresponding to a technical feature in each of the aspects described below can be suitably replaced or combined in order to solve a part or all of the problems of the present disclosure or in order to achieve a part or all of the effects of the present disclosure. Also, the technical feature can be suitably deleted unless described as essential in the specification.

(1) According to a first aspect of the present disclosure, a production management system is provided. The production management system includes: an injection molding unit producing a molded product; and a control device. The injection molding unit includes: an injection molding machine molding the molded product by injection molding; a determination unit determining whether a number of the molded products to be produced is equivalent to a predetermined unit of production or not; and an operation information transmitting unit transmitting operation information of the injection molding unit when it is determined that the number of the molded products to be produced is equivalent to the predetermined unit of production. The control device includes an operation information receiving unit receiving the operation information transmitted from the operation information transmitting unit.

According to such an aspect, the operation information receiving unit of the control device can receive the operation information of the injection molding unit at the timing when the number of molded products to be produced equivalent to the predetermined unit of production are produced. Therefore, whether the production is proceeding as planned or not can be properly grasped and an increase in the data communication volume and the processing load can be restrained.

(2) In the above aspect, the injection molding unit may have a take-out machine taking out the molded product from the injection molding machine. According to such an aspect, even when the injection molding unit is configured to produce the molded product by causing the injection molding machine to mold the molded product and causing the take-out machine to take out the molded product, whether the production is proceeding as planned or not can be properly grasped and an increase in the data communication volume and the processing load can be restrained.

(3) In the above aspect, the injection molding unit may have a molding control unit for molding the molded product according to a production condition. The predetermined unit of production may be decided, based on the production condition. According to such an aspect, the injection molding unit can produce the molded product according to the production condition and can perform the determination by the determination unit, using the unit of production decided based on the production condition, without separately acquiring the unit of production used for the determination by the determination unit. Thus, with simpler control, whether the production is proceeding as planned or not can be properly grasped and an increase in the data communication volume and the processing load can be restrained.

(4) In the above aspect, the control device may have a production condition transmitting unit transmitting the production condition before the molded product is produced. The injection molding unit may have a production condition receiving unit receiving the production condition transmitted from the production condition transmitting unit. According to such an aspect, the injection molding unit can produce the molded product according to the production condition transmitted from the control device and can perform the determination using the unit of production decided based on the production condition.

(5) In the above aspect, the injection molding unit may have an acquisition unit acquiring the predetermined unit of production. According to such an aspect, in the injection molding unit, the determination unit can perform the determination processing, using the unit of production acquired by the acquisition unit.

(6) In above aspect, the injection molding unit may have an input unit accepting an input of the predetermined unit of production. The acquisition unit may acquire the predetermined unit of production inputted via the input unit. According to such an aspect, the injection molding unit can acquire the unit of production used for the determination without having communication or the like with the control device. Therefore, the data communication volume and the processing load on the control device can be reduced further.

(7) In the above aspect, the acquisition unit may acquire the predetermined unit of production from the control device. According to such an aspect, in the injection molding unit, the determination unit can perform the determination, using the unit of production acquired by the acquisition unit from the control device. Therefore, for example, even when the input unit or the like accepting the input of the predetermined unit of production is not provided in the injection molding unit, the predetermined unit of production can be acquired and the determination unit can perform the determination.

What is claimed is:

1. A production management system comprising:
an injection molding unit, the injection molding unit including:
an injection molding machine configured to repeatedly mold a molded product by injection molding, the molded product being formed by a shot of the injection molding;
a robot configured to repeatedly take out the molded product from the injection molding machine and move the molded product to a different location; and
a processor configured to:
receive a target number of the molded products;
determine a reference unit of production by multiplying a predetermined coefficient and the target number, the predetermined coefficient is obtained as a value for production management and quantity management;
count a first number of the molded products that have been taken out from the injection molding machine by the robot;
determine whether the counted first number is equal to the reference unit of production; and
transmit operation information of the injection molding unit when the processor determines that the counted first number is equal to the reference unit of production, the operation information including shot number information relating to the first number; and
a control device configured to:
receive the operation information from the injection molding unit;
calculate a first difference between the target number of the molded products and the first number of the molded products;
calculate a second difference between a target production time and a current production time; and
generate and display a production status on a display as a graph to manage an operation of the injection molding unit based on the operation information, the first difference, and the second difference,
wherein the processor is configured to transmit the operation information including the shot number information to the control device only when the counted first number is equal to the reference unit of production that is either:
a box-based number in which one box corresponds to a number of the shots;
a lot-based number in which one lot corresponds to a number of the boxes; or
a job-based number in which one job corresponds to a number of the lots.

2. The production management system according to claim 1, wherein
the processor is further configured to cause the injection molding machine to repeatedly mold the molded product according to a production condition, and
the reference unit of production is determined based on the production condition.

3. The production management system according to claim 2, wherein
the control device is configured to transmit the production condition to the injection molding unit before the molded product is produced, and
the injection molding unit is configured to receive the production condition transmitted from the control device.

* * * * *